No Printed Specification Available

S. Whitman.

8688X

Making Plaster.

Patented Mar. 11, 1836.

8688X Mar 11. 1835

Samuel Whitman
Letters Patent

The Schedule referred to in these Letters Patent and making part of the same containing a description in the words of the said Samuel Whitman himself of his improvement in a Machine for the purpose of Making Mortar and tending Masons.

To all persons to whom these presents shall come. I Samuel Whitman of Danville in the County of Vermillion and State of Illinois sends greeting. Be it known that I the said Samuel Whitman have invented, constructed and made a new and useful Machine for the purpose of making mortar and tending Masons called the mortar maker and Mason tender not known or used before. There can be as much labor performed by 3 men with this Machine as 12 men can do without it in the same length of time in the ordinary way. The Machine sifts the lime or washes it if necessary, mixes and prepares the mortar and carries the brick and mortar to the summit of the building to any height required. The foundation of the Machine is somewhat similar to that of the frame of a wagon with wheels to carry it about at pleasure. It is about 14 feet in length and 6 feet in breadth. The boxes wherein the lime and sand are sifted and mortar prepared are placed upon that part of the foundation which rests upon the hind wheels which I call the hind part of the machine. The machine goes by horse or ox power. The horse walks upon an inclined band which is lightened and supported by rollers 8 in number which roll with the band nevertheless keeping their position and turning upon their own axis. The band also goes round the main cog wheel on the main shaft and turns it which puts the whole in motion. Plate 1st fig 1st represents a brick building and the machine standing by it. The place of the mortar box, screen box, rollers, upright shaft, horse path or band, winding shaft, Crane &c are plainly designated in writing. B. L. & L. H. represent the cog wheels on the ends of

Figure 1:
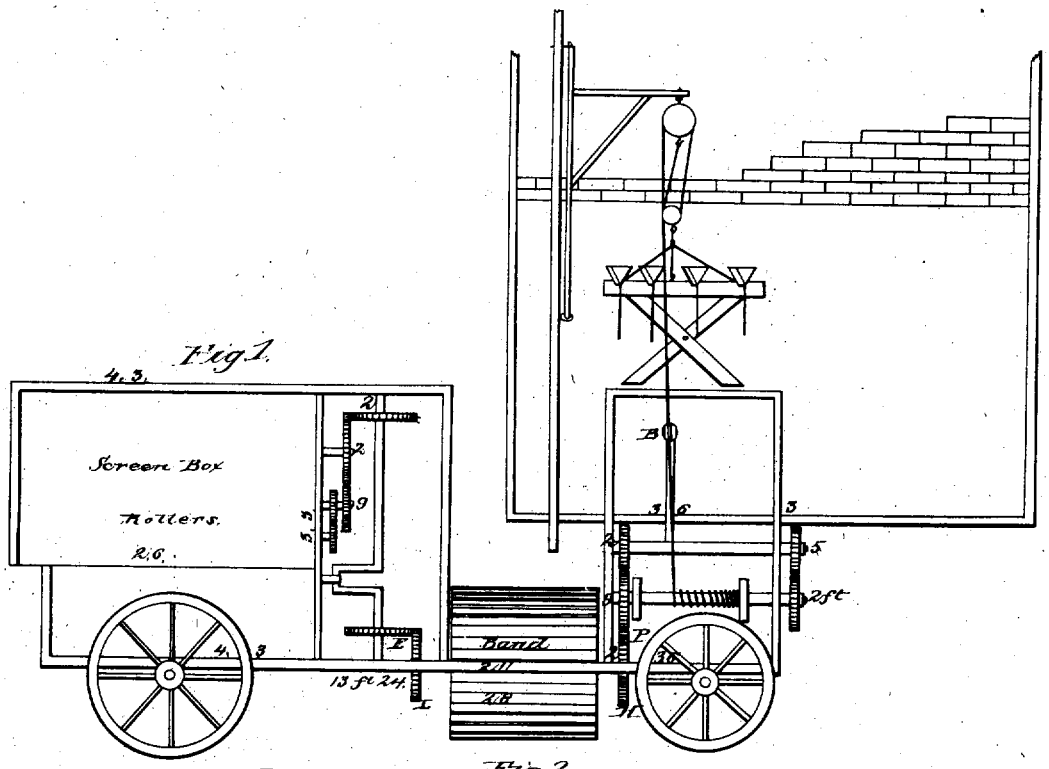
Figure 2:
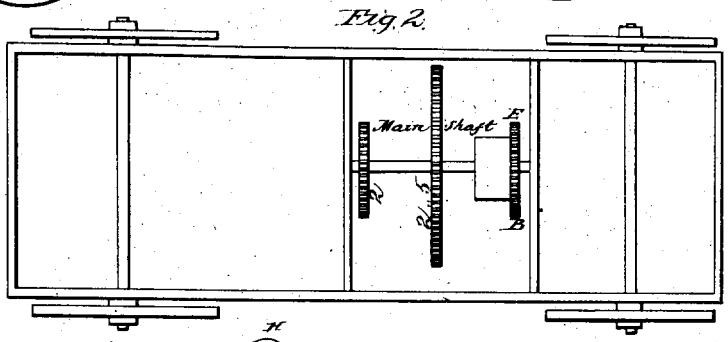
Figure 3:
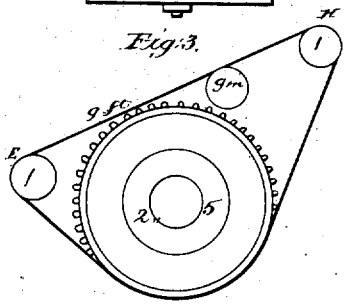
Figure 4:
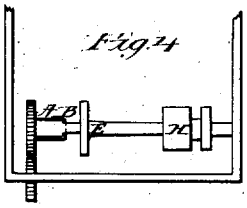
Figure 5:
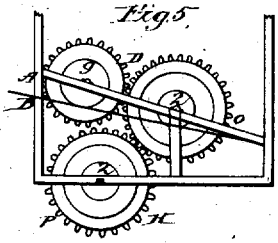

8688X the main shaft described in plate 1 figure 2d. the middle cog
wheel being hid by the band. Plate 1 fig 2d represents the founda-
tion of the machine and the main shaft. The middle wheel is
what I call the main cog wheel around which the band goes. This
wheel is about 4 feet in diameter. The right hand cog wheel E.B.
is that which turns the winding shaft represented in plate 1. fig
4. also in plate 1. fig. 1. which winds the rope that carries up
the brick and mortar. The cog wheel on the other end of the main
shaft is that which moves the upright shaft represented in plate
1. fig. 1. This main cog wheel is under the rollers which the
band rolls over and the band is kept in a triangular form the
hypothenuse or longest side of which the horse walks upon. The band
is composed of iron links fitted to mash into the cogs on the main
cog wheel and upon these links are fastened cletes of wood from
4 to 6 inches wide one upon each link. This forms the path up-
on which the horse walks and occupies the middle part of the
machine as you can see in Plate 1 fig. 1st The band is from 2½ to
3 feet wide. The manner in which the band goes over the rollers
and around the main cog wheel is represented in plate 1 fig 3d the
ends of the rollers only being seen B.H. is the top part for the horse to
go upon. This is a side view of the band. The band is also composed
of 2 leather bands the one fastened to one end of the cletes and the
other to the other end of the cletes one on each side of the iron
chain and parallel with it and passing over the rollers in the
same manner. This is done the better to steady support and strength-
en the band. Plate 1 fig. 4. represents the winding shaft which may
in other words be called a spool which being slid off from a square
axle from A to B. will remain still whilst the other parts of the ma-
chinery are in motion. B.H. represents the spool. A lever may
be used in moving this spool. Plate 1 fig 5. represents the
manner in which the winding shaft is ungeared from the cog
wheel P.H. which causes it to carry up the hods and geared into
another cog wheel a little above it which turns it the contrary
way way and lowers down the hods. D. O. represents the cog wheel
which is fixed stationary and is continually turned by the cog
wheel P.H. that is on the fore end of the main shaft into which
the winding shaft is geared to wind up the hods. 2 levers are used
for this one at each end of the winding shaft. B A D represents the
cog wheel on the winding shaft which being lifted up from B to
A by the lever A.O. and geared into the cog wheel D. O. will be
turned the other way and the hods will be lowered. and the
lever A.O. lowered from A. to B. gears it again into the cog wheel
P.H. The motion of the machine is regulated by means of a drum
on the main shaft Plate 1. fig. 2.d which by its rubbing against
a hoop will impede its progress providing it shall go too fast.
There is a large pole set in the ground upon which is hanged a
crane to which the pullies are fastened by which means the mor-
tar and brick are carried to any height required. One man
will be stationed upon the building to receive the hods and place
the contents where they are needed. The rope will also pass through
a snatch block or pulley near the ground which is fastened to
a short post. Plate 1 fig 1 represents the pullies hods and hod
frame and snatch block. Letter B. represents the snatch block.
The upright shaft represented in plate 1 fig. 1. stands immediate
ly between the band and the mortar and schreen boxes. On
the lower end of this upright shaft is a cog wheel about 1 foot
and ½ in diameter which is carried by the cog wheel on the hind
end of the main shaft mashing into it & turning this upright
shaft. The crank on this shaft moves the rake in the mortar box
more particularly represented in plate 2 fig 6 where the mortar
box rake and crank and the manner in which the rake is
pulled in and out as the crank revolves are to be seen. The cog
wheels on the top of this upright shaft are those which turn the
schreen and likewise the shafts on each side of the upright
shaft which revolve in the lime washers. The mortar box is the
under one and the rake within moves by rolling friction. The
mortar mortar box is about 1 foot and 1/2 in depth 5 feet long and about 4 1/2 feet wide. The schreen box is about 3 feet deep and directly over the mortar box. Plate 2 fig 7 represents the schreen box and schreen and rollers under the schreen &c. The schreen or seive is in form a cylinder revolves on its own axis. the lime and sand are put inside of it and are sifted and fall into the mortar box. The breast cog wheel near the top of the upright shaft turns D.B. the cog wheel on the schreen and this cog wheel turns B.H. one of the rollers and this roller has another cog wheel upon it that turns the other roller by the side of it. The two rollers are placed directly under the schreen they mash together and the lime falls in between them. These mash and make fine all the lumps that may have escaped the schreen. 2 inclined planes one on each side of the rollers nearly meet exactly between the rollers and draw the lime and sand into a very small compass. They are nailed to 2 concaves one on each side of the rollers. The schreen box is slid off leaving the mortar box open by means of an iron crank and 2 small cog wheels one on each side of the machine. The mortar box can then be tilted up and the contents emptied into another box upon the ground. This box has wheels to it to move it about as is most convenient. The wheels and axles may be taken off from this box and this box placed inside of the mortar box for the convenience of carrying. When it is necessary to wash the lime there are 2 boxes that are square one on one side of the upright shafts and the other on the other side cross ways of the machine. The boxes are 1 foot and 1/2 in depth. In each box is a shaft with rakes up on it 3 in number to stir up the lime water and a tunnel also to lead it into the mortar box. These shafts are turned by the cog wheel on the top of the upright shaft. Plate 2 fig. 8 represents the lime washers and the manner in which the cog wheel on the upright shaft mashes into the cog wheels on the shafts that revolve in the lime washers, It is expected that the weight of the horse horse or ox upon the band will be of sufficient force to move all
the machinery and raise the required quantity of bricks and mor-
tar. But if the horse or ox should be too light or it be required to
raise a more than ordinary weight the power may be increased
by drawing. The horse or ox can be made to draw by being geared
to the posts of the machine immediately behind him. The outer
tooth upon the lower rake upon the shafts that revolves in the
lime washer is longer than the others and revolves in a channel
through which the lime water passes. The foundation of the lower
gudgeon inside of this channel is supported by cross bars underneath
it. The crossbar that connects the two levers together that are
on each end of the winding shaft may be raised either by a wind-
lass or lever and the winding shaft geared into the cog wheel
that will turn it the contrary way. What I claim as my own inven-
tion and not previously known in the above described machine is
The manner of putting together the several parts as above described
on the principle therein laid down or in other words the combina-
tion and arrangement of the parts to that intent. In testimo-
ny that the above is a full and exact description of the mode
of construction and operation of my machine as invented or dis-
covered by me I have hereunto set my hand this twenty seventh day
of February eighteen hundred and thirty five Witnesses
C. H. W. Wharton
Henry Stone Samuel Whitman (Drawing)

6+d.
W.G.

[1826 [illegible]]